United States Patent [19]

Foster

[11] Patent Number: 4,822,655
[45] Date of Patent: Apr. 18, 1989

[54] BUTYL RUBBER PREFORMED TAPE SEALANT

[75] Inventor: Van R. Foster, Beaver Creek, Ohio

[73] Assignee: Beecham Home Improvements Products Inc., Dayton, Ohio

[21] Appl. No.: 894,931

[22] Filed: Aug. 8, 1986

[51] Int. Cl.$^4$ .............................................. B32B 27/08
[52] U.S. Cl. ...................... 428/40; 428/354; 428/355; 428/356
[58] Field of Search ............... 428/40, 351, 352, 354, 428/355, 356; 52/35, 287

[56] References Cited

U.S. PATENT DOCUMENTS

| | | | |
|---|---|---|---|
| Re. 30,843 | 1/1982 | Flint | 428/48 |
| 2,303,864 | 12/1942 | Reasor | 52/35 |
| 2,496,349 | 2/1950 | Kellgren et al. | 428/40 |
| 3,708,379 | 5/1971 | Flint | 428/48 |
| 3,837,981 | 11/1972 | Flint | 428/48 |
| 4,101,483 | 7/1978 | Moskal | 524/106 |
| 4,176,097 | 11/1979 | Fox et al. | 524/35 |
| 4,181,711 | 1/1980 | Ohashi et al. | 428/40 |
| 4,288,480 | 9/1981 | Grzywinski et al. | 428/354 |
| 4,311,739 | 1/1982 | Hardman et al. | 427/387 |
| 4,320,076 | 3/1982 | Greenwood | 264/35 |
| 4,345,058 | 8/1982 | Dettling | 528/48 |
| 4,356,676 | 11/1982 | Hauptman | 52/403 |
| 4,432,607 | 2/1984 | Levy | 427/163 |
| 4,629,648 | 12/1986 | Minick et al. | 428/189 |
| 4,654,250 | 3/1987 | Black et al. | 428/352 |

OTHER PUBLICATIONS

"Press—N—Seal", Consumer Products Management Group, Bathtub and Shower Caulk and Rubber Caulk (1–85).
Myro Inc. packaging for "Bathtub Caulk-Strip"(1–85).

Primary Examiner—Nancy A. B. Swisher
Attorney, Agent, or Firm—Jacobs & Jacobs

[57] ABSTRACT

A sealant tape, which comprises a deformable, tacky butyl rubber strip having top and bottom surfaces, a layer of an elastic abrasion-resistant rubber laminated to said top surface, and a strippable release member covering said bottom surface.

3 Claims, 1 Drawing Sheet

BUTYL RUBBER PREFORMED TAPE SEALANT

The present invention relates to butyl rubber caulking compositions provided in the form of a sealant tape.

Butyl rubber caulking compositions are available in the form of cartridges or tubes containing a suspension of butyl rubber. The butyl rubber caulking composition is dispensed through the use of a caulking gun, which requires some skill and hence an infrequent user will not necessarily complete the caulking operation to his satisfaction. In addition, the use of a caulking gun or the like to dispense the butyl rubber caulking composition will require time and effort to clean the caulking gun as well as the surfaces adjacent to the joint being caulked.

Butyl rubber sealant tapes are available, but the tapes presently available suffer from numerous disadvantages. For example, butyl rubber sealant tapes having an exposed butyl rubber surface leave the caulked joint with a tacky surface that will pick up dust and dirt and hence will become unsightly. One butyl rubber sealant tape being marketed is in the form of a strip having a hard, plastic layer attached to one surface thereof. Another butyl rubber sealant tape has an outer Mylar layer. In both cases the exposed surface of the tape is adhesive and is pressed against the joint to be caulked. While these products do not leave the caulked joint with a tacky surface, nevertheless they still have numerous disadvantages.

The present invention provides an improved sealant tape, which comprises a deformable, tacky butyl rubber strip having top and bottom surfaces, a layer of an elastic, abrasion-resistant rubber laminated to the top surface, and a strippable release member covering the bottom surface. The use of the sealant tape according to the invention eliminates the problems of the prior art sealant tapes and provides a non-tacky, abrasion-resistant exposed surface. In addition, the elastic nature of the sealant tape according to the present invention facilitates the caulking of the joints.

The present invention is illustrated in terms of a preferred embodiment in the accompanying drawing, in which.

Figure 1:
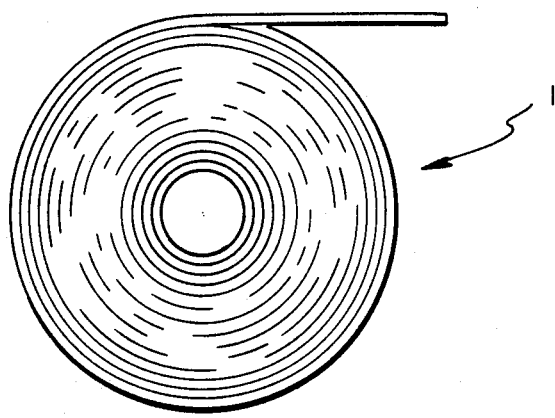
FIG. 1 is a plan view of a coil of the sealant tape according to the present invention.
Figure 2:
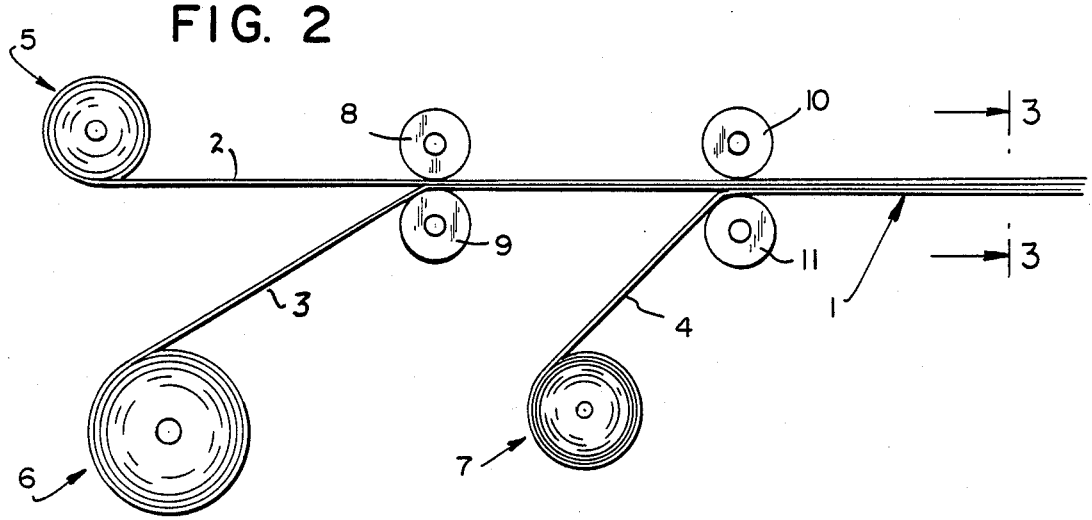
FIG. 2 is a view in section, taken along lines 2—2 of FIG. 1, on an enlarged scale.

With reference to the drawing, FIG. 1 shows a coil of the sealant tape 1 according to the present invention. As seen in FIG. 2, the sealant tape 1 is composed of a layer 2 of an elastic, abrasion-resistant rubber that is laminated to the strip 3 of deformable, tacky butyl rubber. Secured to the butyl rubber strip 3 is a strippable release member 4.

Figure 3:
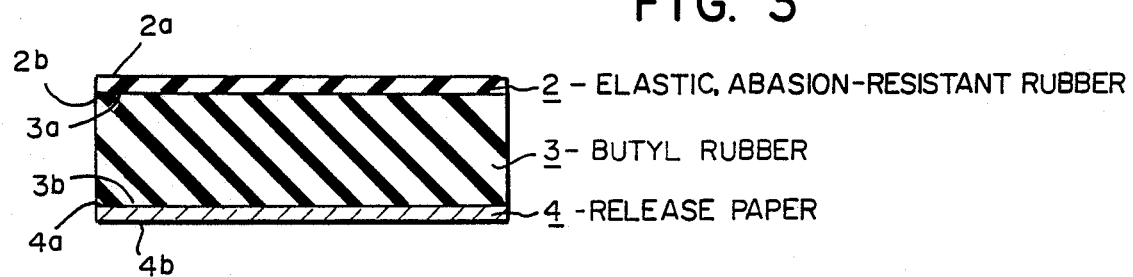
FIG. 3 is a diagrammatic view of the manufacture of the sealant tape according to the present invention.

The sealant strip 1 according to the present invention may be formed by any suitable means, such as the process diagrammatically illustrated in FIG. 3. Thus, the abrasion-resistant rubber used to form strip 2 may suitably be calendared into sheet form, from which segments of the desired length and width are cut thereby forming a plurality of strips 2. Suitably, the segments of strip 2 are formed into a coil 5 as shown in FIG. 3 from which a desired length of strip 2 can be dispensed.

The strip 3 of butyl rubber is suitably formed by extrusion of the butyl rubber into a strip of the desired cross-section. Segments of this strip 3 are likewise formed into coils of desired lengths such as the coil 6 shown in FIG. 3.

The strippable member 4 is also provided in the form of a coil, such as coil 7 in FIG. 3.

With reference to FIG. 2, it may be seen that the strips 2, 3 and 4 are so arranged that the top surface 2a of the strip 2 is exposed, and the bottom surface 2b of strip 2 and top surface 3a of strip 3 are in contacting relationship with one another. The bottom surface 3b of strip 3 is covered by the release member 4, with the top surface 4a of the release member 4 in contact with the bottom surface 3b of the strip 3. The bottom surface 4b of the strippable member 4 is preferably provided with a low-tack, pressure sensitive adhesive coating to facilitate the provision of the strip 1 in the form of the coil shown in FIG. 1, and to maintain the integrity of the coil during handling and use.

With reference to FIG. 3, the strips 2 and 3 are fed from the respective rolls 5 and 6 between the nip of rollers 8 and 9, with the surfaces 2b and 3a in contact with one another. Rollers 8 and 9 laminate members 2 and 3 together, and this laminate is then passed through the nip of rollers 10 and 11, along with the strip 4 fed from roll 7. If strip 4 is provided with the layer of low-tack pressure sensitive adhesive on surface 4b, strip 4 is fed into rollers 10 and 11 with the surface 4a in contact with the surface 3b of the butyl rubber strip 3. The laminated strip 1 is then removed and cut into the desired lengths to form the coil shown in FIG. 1. As will be realized, the strip 1 is coiled in such a manner that the low-tack adhesive coating on surface 4b contacts the outer surface 2a of the next adjacent coil.

To use the sealant tape 1 according to the invention, the user will unwind a desired length of the strip 1, which will have the effect of detaching the release member 4 from the butyl rubber strip being unwound, due to the fact that the low-tack adhesive coating maintains the release member 4 in contact with the surface 2a of the next adjacent coil. The segment uncoiled from the coil is then cut to length and the exposed surface 3b of the butyl rubber strip 3 is firmly pressed against the joint. The elasticity of the abrasion-resistant rubber layer 2 and the deformability of the butyl rubber strip 3 work together to insure that the sealant tape is accommodated into the joint to be caulked despite any irregularities in the surfaces forming the joint and/or any bends or corners that have to be accommodated. When segments of the sealant tape that are cut from the coil contain the release member 4 secured to the surface 2a of the abrasion-resistant rubber strip 2, this releasable member is be stripped away before or after the joint is caulked.

The butyl rubber used to form the strip member 3 may suitably be a butyl rubber used in conventional caulking compositions, such as copolymers of isobutylene and a small amount of a diene, such as about $1\frac{1}{2}$ to about $4\frac{1}{2}\%$ isoprene. Generally, useful butyl rubbers have a Mooney viscosity at 100° C. ranging from about 40 to about 65 and they will either be non-crosslinked or only crosslinked to a small extent. As is known, the tack of butyl rubber is reduced as the degree of cross-linking increases, and it is preferred to use a non-crosslinked butyl rubber in connection with the present invention. Indeed, it is preferred to employ plasticizers and/or tackifiers in the butyl rubber used to form strip 3, such as polybutenes, parraffinic oils, petroleum resins, phenol resins, rosin and the like. In addition, the usual additives conventionally employed in butyl rubber may be used in the present invention as well, such as fillers, for example, talc, calcium carbonate, clay, and the like, UV stabilizers, pigments, rheological additives, anti-slumping agents, and the like. The preparation of butyl rubber sealants, including preformed butyl rubber sealant tapes, is well known in the art. See, for example, Handbook of Adhesives, Second Edition, 1977, Van Nostrand Reinhold Company, New York, pages 259–260, 267 and 268.

Usefully, a butyl rubber formulation suitable in the present invention may comprise, per 100 parts by weight of butyl rubber, from about 90 to about 160 parts of a tackifier, from about 100 to about 250 parts of filler and up to about 50 parts of other additives, such as rheological additives, adhesion promoters, such as organoaminosilanes, and the like. In the preferred formulations, the butyl rubber employed will have a Mooney viscosity at 100° C. of from about 40 to about 50.

The abrasion-resistant elastic rubber used to form strip 2 is desirably an SBS or SEBS block copolymer, namely, a styrene-butadiene-styrene block copolymer or a styrene-ethylene-butadiene-styrene block copolymer, respectively. These thermoplastic block copolymer rubbers are known and are commercially available, for example, from Shell Chemical Co. under the trademark Kraton. The SBS block copolymer rubbers may suitably contain from about 25 to about 50% of polymerized styrene with the balance being the rubber component. In the case of the SEBS rubber, the styrene will comprise from about 25 to about 35%, with the balance being the rubber component. SBS and SEBS rubbers are commercially available in the form of a rubber crumb, which is readily processed by conventional calendaring equipment to form a sheet of the desired thickness.

The present invention is illustrated in terms of preferred embodiments in the following examples. In this specification and the appended claims, all parts, percentages and ratios are by weight, unless otherwise stated.

EXAMPLE 1

The following materials were mixed in a sigma blade mixer fitted with an extrusion die, and a strip of butyl rubber was extruded. The butyl rubber strip was 3/16" wide and 1/16" thick.

|  | Parts |
| --- | --- |
| Butyl rubber[1] | 100 |
| Polybutene (Tackifier; plasticizer) | 135 |
| $CaCO_3$ (Filler) | 130 |
| Talc (Filler) | 65 |
| Cellulosic Fiber (Anti-slump agent) | 15 |
| Silane[2] (Adhesion promoter) | 5 |

[1]Mooney viscosity 100° C.: 41–49
[2]Gamma-aminopropyltriethoxysilane

An SEBS rubber strip was formed from the following materials by mixing the ingredients together and then calendaring the resulting mixture into a 12 to 15 mil thick sheet, which was then cut into strips that were 3/8" wide.

|  | Parts |
| --- | --- |
| SEBS Block Copolymer[1] | 100 |
| Mid-Block Processing Resin[2] | 25 |
| Dioctylphthalate (Plasticizer) | 25 |
| $TiO_2$ (Pigment) | 10 |
| Other[3] | 2 |

[1]Styrene/Rubber Ratio 29:71
[2]Medium softening point hydrocarbon resin
[3]UV absorber and stabilizer; anti-oxidant The SEBS rubber strip was then rolled onto the butyl rubber strip and a release paper was then placed over the exposed surface of the butyl rubber strip. The release paper was provided with a pressure-sensitive adhesive layer on one side and a silicone release surface on the other side, and the release paper was pressed against the butyl rubber surface with the silicone release surface in contact with the butyl rubber.

The resulting sealant tape was used to caulk a joint by removing the release paper and pressing the exposed butyl rubber surface into the joint. The caulked joint thus obtained had a non-tacky abrasion-resistant exposed surface. The strip had excellent flexibility and elasticity to enable it to be molded around irregular and/or uneven joints. In appearance, the caulked joint provided a high gloss surface that was aesthetically attractive.

The strip of this Example had excellent adhesion to glass and fiberglass after water immersion and exceptional weatherability, thereby making it suitable for use outdoors. Of course, this strip can be used indoors as well.

EXAMPLE 2

Example 1 was repeated, except that the butyl rubber was prepared using the following formulation.

|  | Parts |
| --- | --- |
| Butyl rubber[1] | 100 |
| Polybutene | 133 |
| $CaCo_3$ | 143 |
| Talc | 57 |
| Polyamide wax[2] | 14 |

[1]Mooney viscosity 100° C.: 41–49
[2]Melting point: 123–129° C. (Dislon 6500; Kusomoto Chemicals, Ltd.)

EXAMPLE 3

Following the procedures of Example 1, a sealant tape according to the invention was prepared using the butyl rubber strip of Example 1 or 2 and an SBS block copolymer rubber strip prepared as in Example 1 but substituting 100 parts of an SBS block copolymer (styrene/rubber ratio 28:72) for the 100 parts of the SEBS block copolymer.

The strip of this Example also provided a non-tacky abrasion-resistant surface for the caulked joint. As in Examples 1 and 2, the strip had excellent flexibility and elasticity to enable it to be molded around irregular or uneven joints and around corners. A high gloss surface was also obtained as in Examples 1 and 2. The strip of this Example is suitable for indoor use.

I claim:

1. A sealant tape, which comprises a preformed strip of a deformable, tacky butyl rubber caulking composition having top and bottom surfaces, an elastic, abrasion-resistant preformed layer of an elastic abrasion-resistant rubber selected from the group consisting of styrene-butadiene-styrene block copolymers and styreneethylene-butadiene-styrene block copolymers laminated to said top surface of said preformed strip, and a strippable release member covering said bottom surface of said preformed strip, whereby the sealant tape is sufficiently deformable, flexible and elastic to be pressed into sealing contact with uneven joints and corners to be caulked.

2. The sealant tape according to claim 1, wherein said abrasion-resistant rubber is a styrene-butadiene-styrene block copolymer.

3. The sealant tape according to claim 1, wherein said abrasion-resistant rubber is a styrene-ethylene-butadiene-styrene block copolymer.

* * * * *